April 20, 1954  G. F. WALES  2,676,087
RECORDING DEVICE
Filed March 20, 1950  5 Sheets-Sheet 1

INVENTOR.
GEORGE F. WALES
BY Edwin B. Gary
Attorney.

April 20, 1954     G. F. WALES     2,676,087
RECORDING DEVICE
Filed March 20, 1950                 5 Sheets-Sheet 2
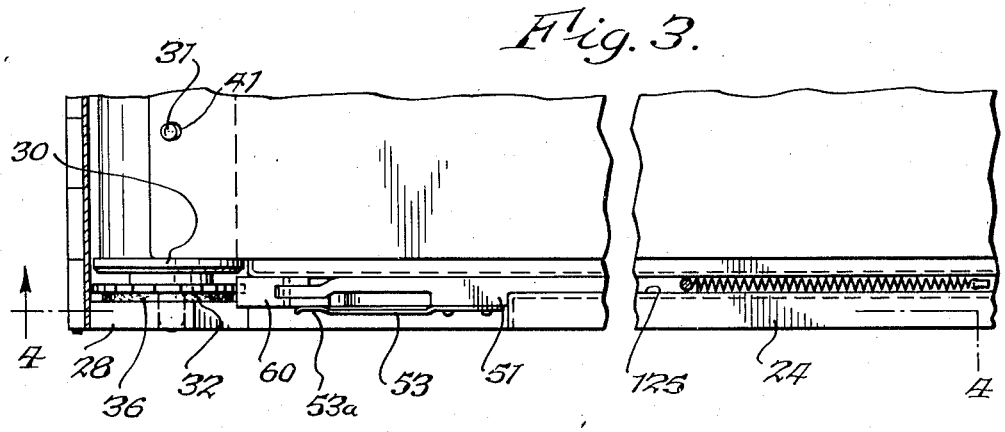
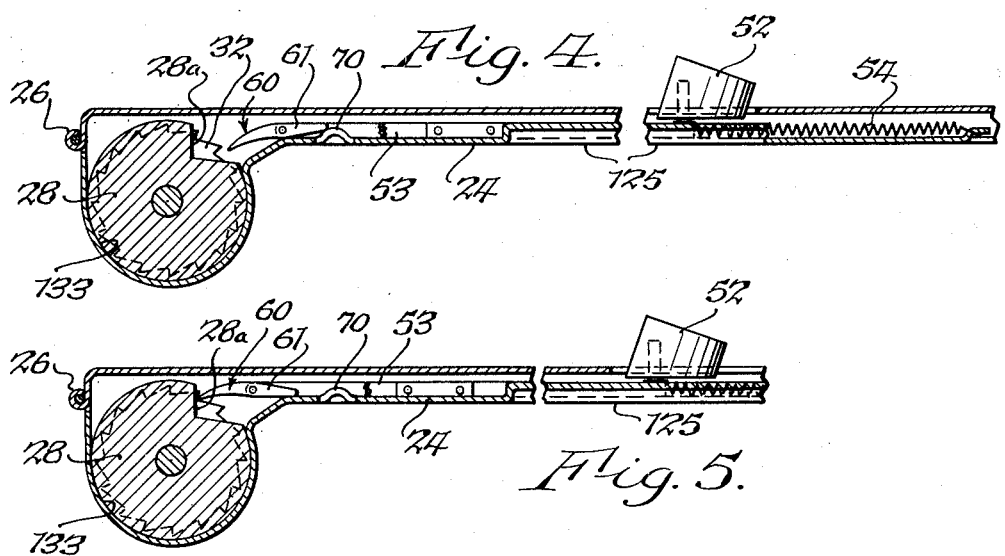
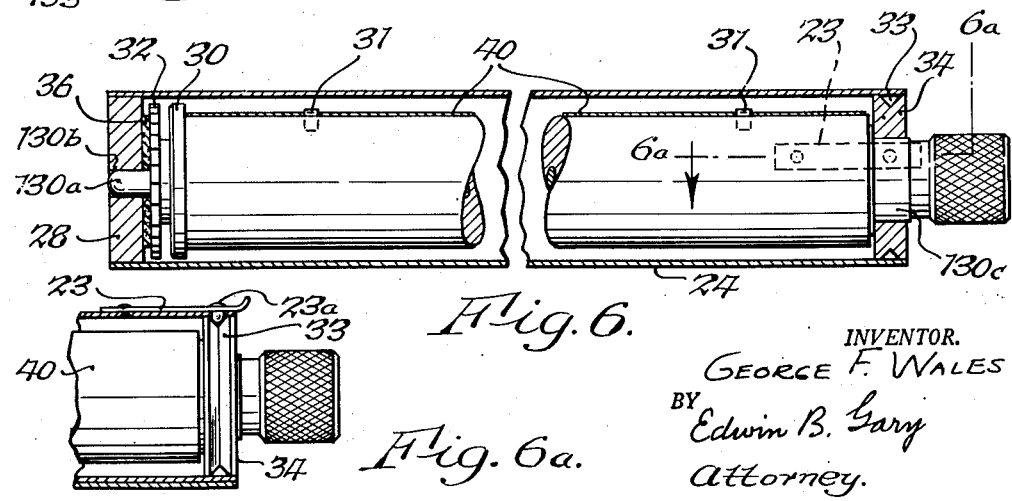
INVENTOR.
GEORGE F. WALES
BY Edwin B. Gary
Attorney.

INVENTOR.
GEORGE F. WALES
BY Edwin B. Gary
Attorney.

April 20, 1954

G. F. WALES 2,676,087

RECORDING DEVICE

Filed March 20, 1950

INVENTOR.
GEORGE F. WALES
BY
Edwin B. Gary
Attorney.

April 20, 1954 G. F. WALES 2,676,087
RECORDING DEVICE
Filed March 20, 1950 5 Sheets-Sheet 5
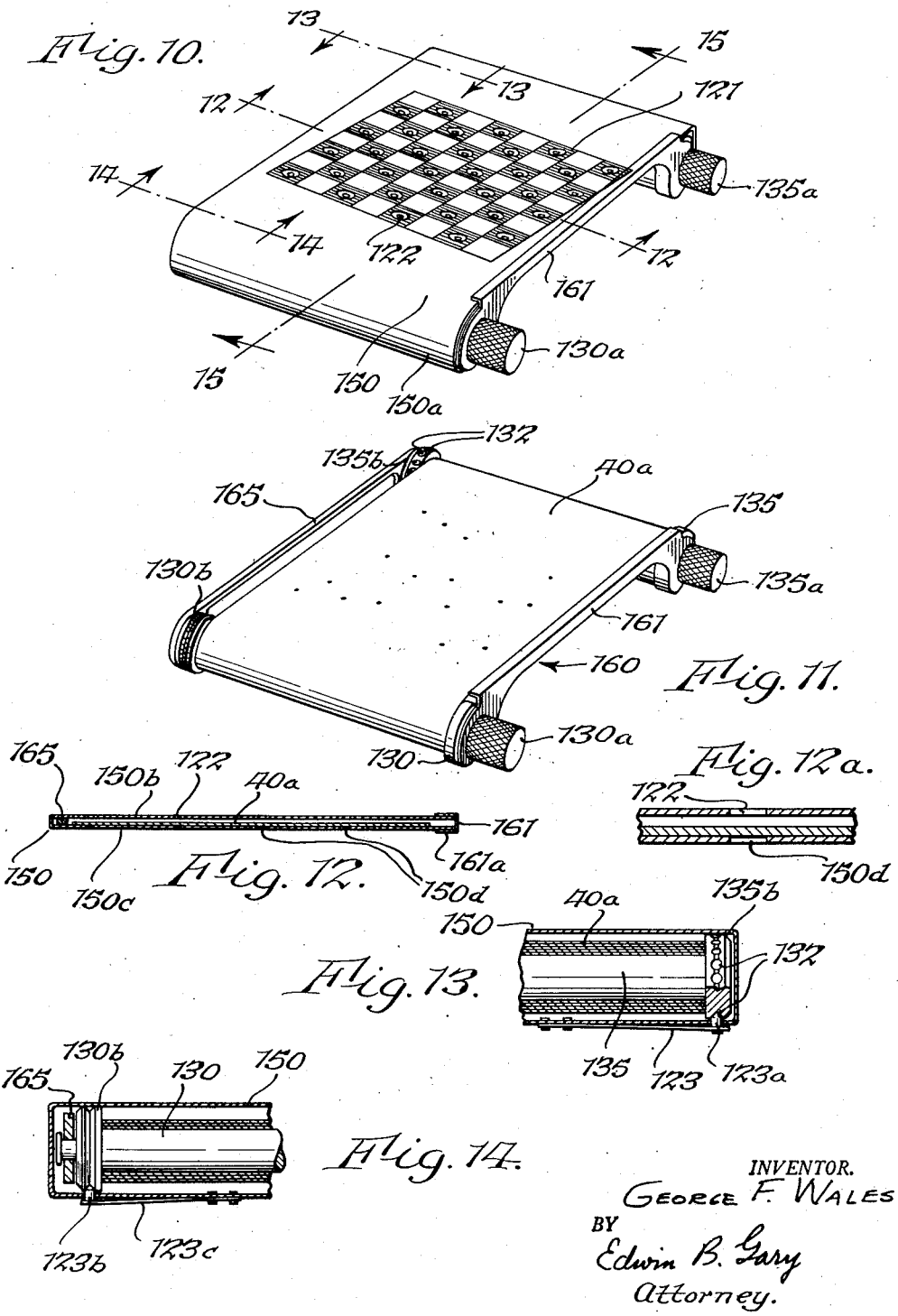
INVENTOR.
GEORGE F. WALES
BY Edwin B. Gary
Attorney.

Patented Apr. 20, 1954

2,676,087

UNITED STATES PATENT OFFICE 2,676,087

RECORDING DEVICE

George F. Wales, Kenmore, N. Y.

Application March 20, 1950, Serial No. 150,670

2 Claims. (Cl. 346—78)

This invention relates to an instruction and educational device which, although not necessarily so limited, is characterized by features which render it of particular utility for recording and indicating the moves of the game pieces, or men, of various games of position such as chess, checkers and the like, whereby to facilitate the study and teaching of such games in such a way that the novice and the expert may acquire knowledge and gain skill in a highly interesting and entertaining manner.

In my co-pending application, Serial No. 150,669 I disclose a game accessory in which a card or other printed or perforated record medium is manually grasped and advanced through a holder in the form of a sleeve. The record is advanced in accordance with a printed pattern of indicia for the moves in the game which serve to permit visible alignment of the record in accordance with given increments of movement.

In my other co-pending application, Serial No. 155,150 I have disclosed a recording and indicating device for the purpose herein generally contemplated wherein a record form is movable under a game board having apertures formed therein in a pattern corresponding to the positions to which game pieces may be moved, there being a die plate located under the record form having apertures aligned with those in the game board. The record form may be caused to move step-by-step and is formed with apertures or other indicia which when moved into registration with the aligned apertures in the game board and die plate permit the emission of light from a light source located under the record form to indicate the game piece involved in a particular play, its origin and destination.

The present invention is concerned with a recording and indicating device characterized by features which render it as simple and compact in design as the device of my co-pending application, Serial No. 150,669 but which eliminates the necessity of accurate feed and of visibly aligning the record. This device is particularly adaptable for use wherever ease of portability is desirable with the absence of effort with respect to aligning the record. The device, for example, may be employed by the participants in a game or carried to a game tournament and availed of by an observer to record the moves in any game or games in which the observer may be interested. The games so recorded may be subsequently re-played on a suitable game board by reference to the recorder or may be re-played on the recorder itself if the latter is of a sufficient size to accommodate the game pieces directly thereon.

Heretofore, it has been proposed to impart knowledge of chess, checkers and similar games by means of record forms associated with boards upon which the game may be played. For example, the Howell Patent No. 529,913 proposes to teach chess, checkers and the like by means of a record marked with a pattern of numbers which indicates each game piece and its position, the pattern of numbers being repeated unchanged for each move except for the particular game piece which is to be moved. Howell's device, therefore, has the disadvantage that the numbers are difficult to observe through the sixty-four small windows in the game board. There is the further disadvantage that the entire board must be scanned before it can be determined which particular game piece is to be moved.

The Ortiz Patent No. 1,532,069 discloses a game instruction device similar to that shown in the Howell patent in the respect that printed records are associated with the game board. The record shown in the Ortiz patent, however, indicates moves by means of arrows which are visible through the transparent game board. In the use of this device, the record must be moved a distance equal to the dimensional extent of the board in the direction of travel of the record and visually aligned to assure the arrows indicating the correct origin and destination of each move. Obviously, the necessity for moving the record such a large distance for each move is a disadvantage as is the inability to record moves on the record, this latter disadvantage also being characteristic of the instruction device of the Ortiz patent and of other prior art devices.

The principal objects of the present invention, therefore are: (1), to provide a device which, under certain conditions, may be more suitable than the devices disclosed in my co-pending applications above identified, and, (2), to overcome the objections noted above which are characteristic of the prior art devices.

A further object is to provide a device which is simple and compact in design, occupying such a small space that it may be readily carried on the person of the user.

A still further object is a device which is so designed that the necessity of a special instrument for providing the indicia on the record will be avoided, a pencil, pen or any other similar marking means being suitable for this purpose.

Another object of this invention is to provide a game instruction device which may be availed of to record the moves of a game in such a manner that such game, or moves thereof, may be re-played at any time, it being understood that the device is available for use in connection with printed records, and other records not necessarily produced on it, which may be prepared for purposes of education, instruction and entertainment.

A related object is to provide a device characterized by features which facilitate identification of the game piece involved in any particular move, its origin and its destination.

A still further object is to provide a device which may be utilized to record or indicate, either or both, the moves of the game pieces of a game of the character described.

Yet another object is to provide a device wherein with respect to any particular move only the origin and destination of the particular game piece involved is recorded or indicated, there being provision, however, for recording or indicating at any stage of the play the positions of all of the game pieces, or all of the game pieces of one player.

A further object is a device wherein provision is made for indicating the positions of all of the game pieces in the game, at any stage or stages of play, while requiring only two indicia for designating any particular move.

A further important object of the invention is to provide a device wherein the game board area and the record form are so related that the capacity of the record form with respect to the number of indicia which it may carry is greatly increased, this having the advantage that the number of games or moves which a record form may carry is correspondingly increased and having the further advantage that the distance which the record form is advanced between moves is of such a small magnitude that such movements may be effected rapidly and accurately with simple feed mechanisms.

A still further object is to provide a device having a positive and accurate mechanism for moving the record form.

A related object is a device wherein provision is made for accurately registering the record form with the above mentioned mechanism.

A still further object is a novel design and arrangement of the parts of the device, whereby to insure simplicity in construction and accuracy and dependability in operation and whereby to provide a device which is highly attractive and ornamental in appearance.

The invention is illustrated in the accompanying drawings, wherein:

Figure 3 is an enlarged fragmentary section taken along line 3—3 of Figure 1;

Figure 4 is a detail sectional view taken along line 4—4 of Figure 3, showing the normal relation of the parts of the feeding mechanism;

Figure 5 is a view similar to Figure 4 showing the parts of the feed mechanism at the end of a working stroke;

Figure 6 is an enlarged transverse section taken along line 6—6 of Figure 1;

Figure 6a is a detail section taken along line 6a—6a of Figure 6;

Figure 10 is a perspective view of a smaller version of the device, being of a size such that it may be readily carried in a pocket or purse;

Figure 11 is a perspective view showing the record and feed mechanism therefor removed from its cover;

Figure 12 is a transverse section taken along line 12—12 of Figure 10;

Figure 12a is a fragmentary transverse section taken along the line 12—12 of Fig. 10 but on a considerably larger scale than the scale of Fig. 12;

Figure 13 is an enlarged detail sectional view taken along line 13—13 of Figure 10;

Figure 14 is a similar detail section taken along line 14—14 of Figure 10; and

The device shown in Figures 1 through 10, and indicated generally at 20, is readily portable although of a size suitable to easily permit the playing of a game directly on the checkered surface 21 thereof. Hence, it may be readily carried to a tournament or any other place where it is to be employed for recording or instruction purposes, it being apparent that in the playing of a game directly upon the device, game pieces of the type disclosed in my copending applications, Serial No. 155,149, may be employed so that the record under them will be clearly visible.

Figure 1:
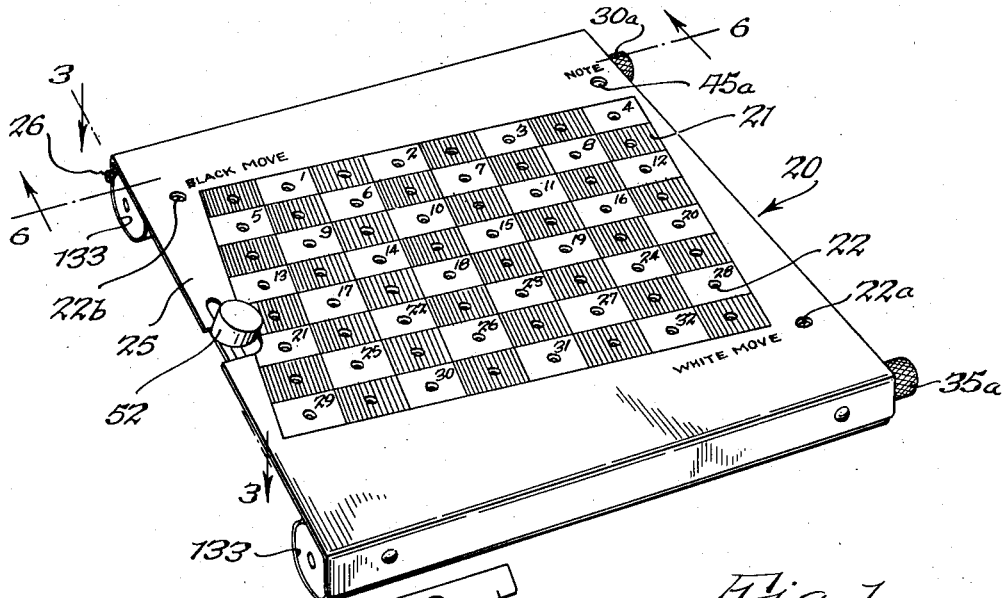
Figure 1 is a perspective view of a device embodying the features of the invention.

In the embodiment illustrated in Figure 1, the checkered surface 21 is provided on the upper surface of a cover 25 and the latter is formed with apertures, or windows, 22, so that an aperture, or window, is located at the center of each square of the game board, although such central location is not essential. The squares of the checkered area may, in accordance with conventional practice, be numbered 1 through 32 to facilitate identification of the playing pieces in checkers and the designation of moves in connection with the instruction and description of the game. As the device is illustrated, a game of chess or similar game in which all the squares are utilized can also be recorded as each of the 64 squares of the device has an aperture 22.

The cover 25 is in the form of a panel, being formed with a flange 20a at its forward edge and being hinged at its rear edge as at 26 to the rear edge of a bottom member 24, the latter being formed adjacent its forward and rear edges to provide arcuate, transversely-extending channels 133 for accommodating feed rolls 30 and 35 which are provided with knobs 30a and 35a, respectively, and which carry a record form 40. Intermediate the channels which accommodate the feed rolls 30 and 35, the bottom member 24 is elevated and, in the closed position of the cover 25, is located in close proximity to the underside of the cover so that it may provide a backing for the portion of the record strip to be acted upon by indicia-providing means inserted through the apertures 22.

As best illustrated in Figure 6, the roll 30 is provided with driving pins 31 and carries a trunnion 130a which occupies a bore 130b in a disklike bearing support 28. The latter is secured in one end of the channel which accommodates the feed roll 30. At its opposite end, the feed roll 30 is formed with a reduced extension 130c which has a bearing ring 34 fixed thereto, the periphery of the bearing ring being formed with an annular groove 33 for accommodating a detent 23a (Figure 6a) which is carried by a spring finger 23 mounted on the bottom member 24. The feed roll 35 is similarly mounted in its channel 133. The grooves 33 in the bearing rings 34 co-operate with the detents on the spring fingers 23 to assure alignment of the rolls 30 and 35 and the record thereon with respect to the checkered surface 21 on the cover 25. This combination of detents and grooves also serves initially to maintain the free ends of the record rolls in place until the cover 25 is closed, the latter thereafter co-operating with the bottom member to hold the bearing rings 34 in place.

To install a record 40 in the recorder 20, the cover 25 is opened and the roll 35 is moved upwardly to release it from the detent 23a which engages it and is then moved axially to release the trunnion 130a at its opposite end from the bearing support 28. A record may then be wound on the roll 35 and the roll replaced. The end of the record 40 is then brought across the elevated portion of the bottom member 24 of the device and apertures 41 in the end of the record are engaged over the pins 31 on the roll 30 as best shown in Figure 3. The hinged cover 25 is then closed, the flange 20a snapping over protuberances 129 on the bottom member to latch the cover in this position.

Means are provided for accurately advancing the record strip step-by-step beneath the checkered surface 21. The said means, as best shown in Figures 3, 4 and 5, includes a slide 51 having a knob 52 for advancing it, the said knob extending through a cut-out marginal edge portion of the cover 25 and the slide being movable in a channel provided by a lengthwise-extending stiffening rib 125 formed in the bottom member 24. The slide is normally held in a retracted position by a spring 54 which is connected to it at one end, the opposite end of the slide carrying a pawl 60 which is located in co-operating relation with respect to a ratchet wheel 32 carried by the roll 30. The ratchet wheel 32 is fixed to the roll 30 and the teeth thereof are accurately related with respect to the pins 31 which are carried by the roll. Normally the spring 54 holds the slide 51 in the position shown in Figure 4, in which position the pawl 60 is retracted and held out of contact with the ratchet wheel 32. In the retracted position of the slide, a tail-piece 61 on the pawl 60 engages a cam projection 70 on the bottom member 24, the cam projection being operative to hold the nose portion of the pawl 60 depressed, as shown. To advance the record form 40, the knob 52 may be grasped and the slide 51 moved forwardly thereby, during which movement of the slide the pawl 60 engages the ratchet wheel 32 and turns it until the nose of the pawl engages a stop provided by the rear wall at 28a of a notch formed in the bearing support 28, as shown in Figure 5. The stop provided by the wall 28a insures advancement of the record form a predetermined, unvarying distance each time the slide 51 is operated. Upon release of the knob 52, the spring 54 is automatically operative to return the slide to its normal position, during which movement the nose of the pawl 60 will be lowered as the tail-piece 61 thereof rides up on the cam projection 70. It will be noted that the pawl 60 is rocked in one direction as it turns the ratchet wheel and is rocked in the opposite direction as it is restored to its normal position. A spring finger 53 (Figure 3) which is carried by the slide 51 has a free end 53a which frictionally engages the tail-piece 61 of the pawl at all times and which is operative to permit movement of the pawl in the manner described yet hold it in either position to which it is moved until positively rocked either by the ratchet wheel or by the cam projection. Friction discs 36 (Figure 6) between the ends of the rolls 30 and 35 and the bearing supports 28 resist free turning movements of the rolls and in so doing maintain the portion of the record form between the rolls under the desired uniform tension.

It will be apparent from the foregoing that the record form 40 may be advanced a predetermined, unvarying distance by moving the knob 52 forwardly, the invention contemplating the movement of the record form one step after each move of a game piece has been recorded. While it is possible to perforate the record 40, to provide indicia thereon, such indicia may be readily provided by marking through the apertures 22 upon the record form 40 with a suitable marking instrument such as, for example, a pencil or pen.

Figure 2:
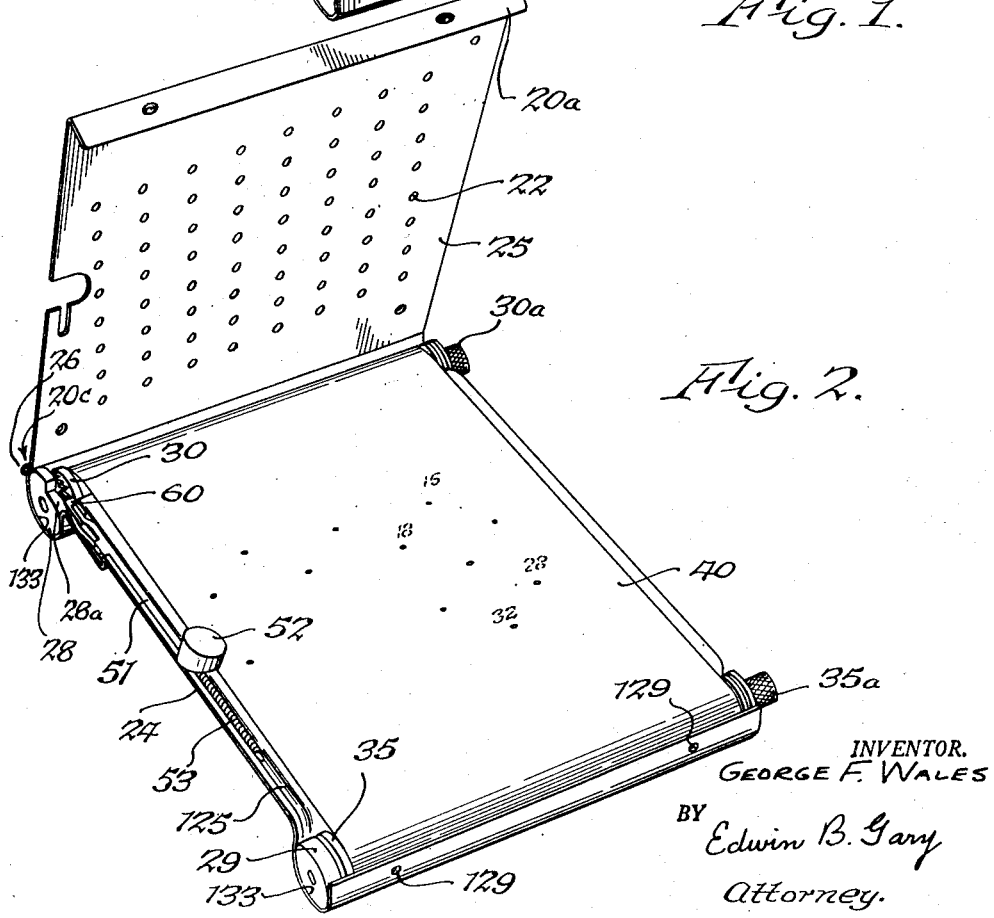
Figure 2 is a similar view with the cover opened to show the relative positions of the record, feed rolls, feed mechanism and associated parts.
Figure 8:
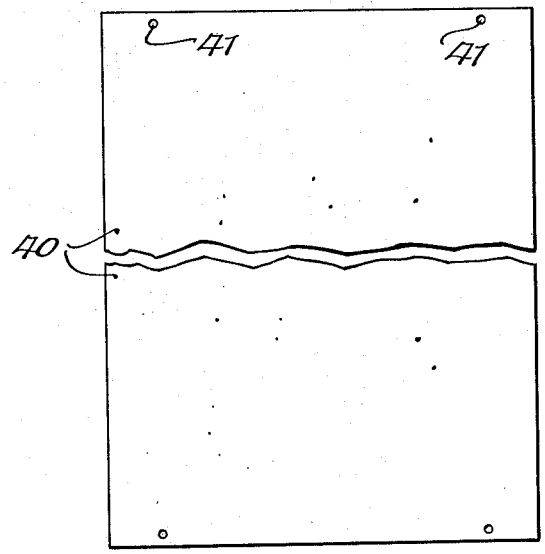
Figure 8 is a view of a record form, a recorded problem being shown thereon.
Figure 9:
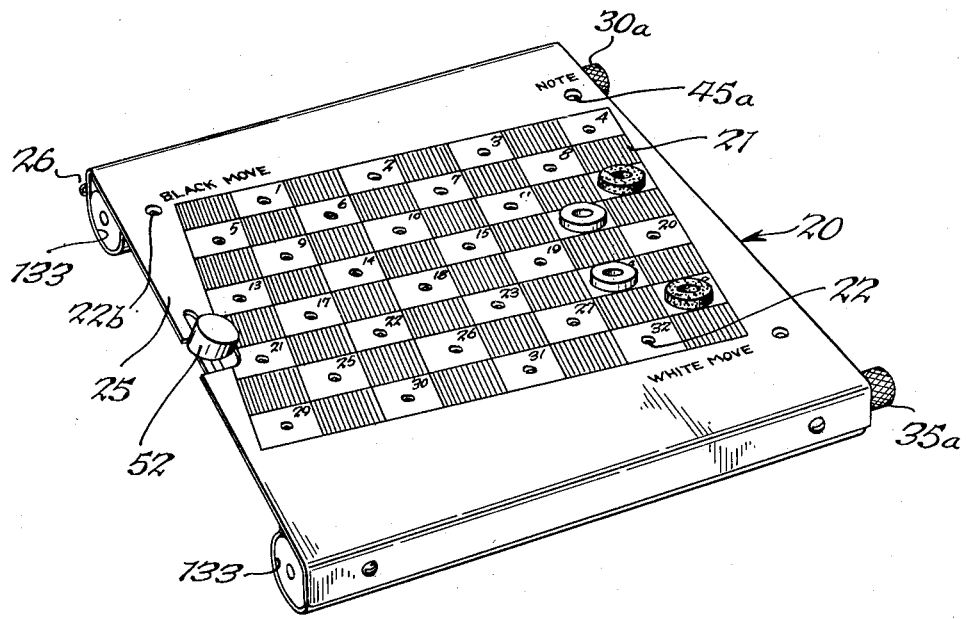
Figure 9 is a perspective view similar to Figure 1, illustrating the manner in which a game may be played upon the device in accordance with the indicia on the record exposed through the apertures or windows of the board.

The move of any game piece may be recorded by two indicia, one indicia indicating the location of the game piece involved in the particular move, and hence its origin, and the other indicia indicating the destination of the game piece. Preferably, a third indicia is marked upon the record through an aperture 22a or 22b for the purpose of indicating the player involved in the particular move. Thus a simple mark in the form of a dot can be availed of to indicate the origin of the move and a similar dot to indicate the destination. Since only simple marks, or indicia, are made on the record form 40, as shown in Figures 2 and 8, such marks can be readily distinguished when the device is employed to indicate moves previously recorded.

Figure 7:
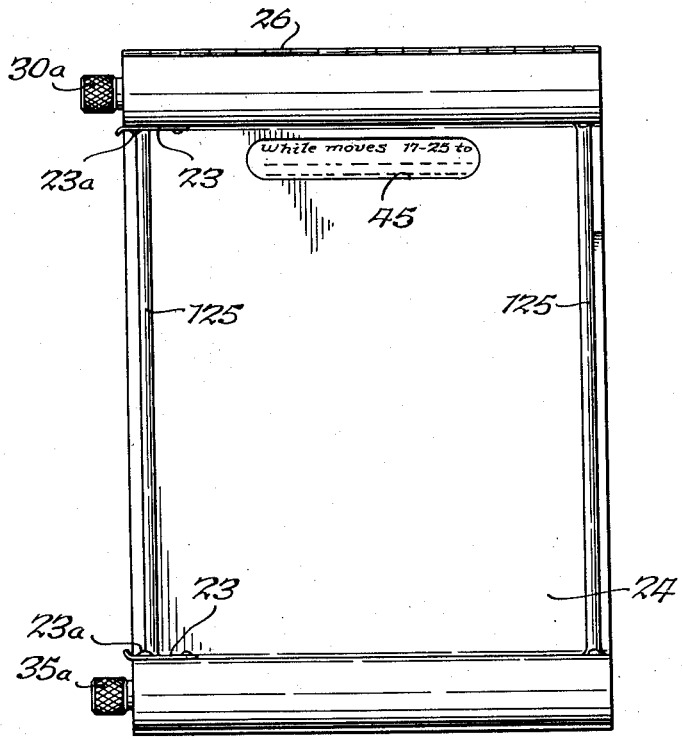
Figure 7 is a view of the back of the device showing the window through which the back of the record is exposed so that miscellaneous notes may be made thereon.

To illustrate the positions of all of the game pieces at any particular stage of a game, should this be desirable, it will be necessary only to mark the location of all of the playing pieces of one player through the apertures 22, a mark being made through the apertures 22a or 22b to identify the player. The record form 40 may then be advanced a step and the procedure repeated with respect to the game pieces of the opposing player. Thus, at any stage of the game, when the relative positions of all of the men is believed critical, such positions can be readily determined. To aid further in the play, at any particular stage, notes may be inscribed on the back of the record form 40 through a window 45 (Figure 7). The window referred to permits the writing on the back of the record form of notes pertinent to the particular move involved as, for example, indicating the strategy behind a particular move on the part of one of the players. Visible notice of this note may be indicated through a window 45a in the cover 25, it being only necessary to make a mark upon the record through the window 45a at the time the note is written upon the back of the record.

It is also contemplated to have a small checker board pivoted on the reverse side of the record 40 which would be visible through note window 45 and which could also indicate the positions of all of the game pieces in the game at any stage of the play. This can be availed of to illustrate all of the positions of the game pieces at a particular stage of a game, as well as for the initial set-up of a game problem.

Another use for which the apparatus 20 can be utilized is for revealing only one element of a move through apertures such as either the origination or destination of the game piece with the student attempting to complete the move. The choice of the missing element of a move can then be verified by advancing the record which will reveal by indicia whether the choice was correct. In the event there is a choice of equally advantageous moves, at a stage of the play, the alternates can be given in sequence.

Referring to Figures 1 and 2 it will be noted that the apertures 22 in the cover 25 are arranged in a plurality of parallel, linear series which extend at an angle with respect to the marginal edges of the record form and the line of travel of the latter. Preferably, this angular relation and the spacing of the various series of apertures is such that only one indicia will be located along any line parallel to the line of travel of the record strip. The arrangement of the apertures in the manner described has the advantage that only those indicia involving a particular move will be visible at any one time. A further advantage is that the capacity of the record form with respect to the number of indicia which it may carry is substantially increased, it being noted that even though the record form may carry indicia representing moves involving a plurality of checkered squares in the same linear series, each indicia provided on the record form will register with the aperture through which it was produced so that the particular moves, in the proper sequence, will be indicated when the record form is subsequently passed through the device for this purpose.

In the embodiment of the invention illustrated in Figures 10 through 15, the device is more simple and compact in design than the one heretofore described, being of such a size that it may readily be carried in a pocket or purse. It possesses, however, the desirable characteristics relating to recording and accurate positioning and feeding of the record form, as noted in connection with the embodiment first described.

Figure 15:
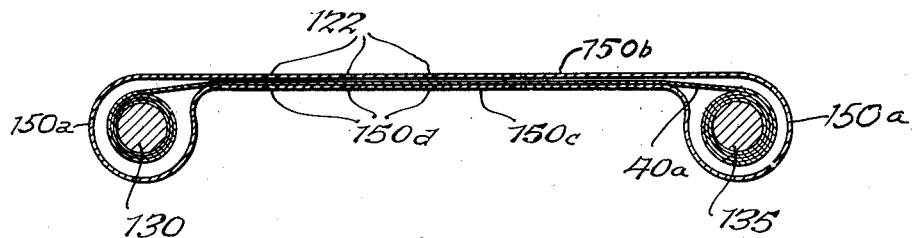
Figure 15 is a longitudinal section taken along line 15—15 of Figure 10.

As illustrated, the record form 40a (Figure 11) is carried by an assembly which is in the nature of a cartridge, the latter being indicated generally at 160 and including feed rolls 130 and 135. The feed rolls are journaled at one end in a cap-piece 161 and at the other in a tie bar 165 and carry knobs 130a and 135a, respectively, at the end by which they may be turned. The cartridge 160 is carried in, but is readily removable from, a case 150 which, as best shown in Figure 15, is formed at its ends to provide cylinders 150a for accommodating the feed-roll ends of the cartridge 160. Between its cylinder-like ends, the case 150, as best shown in Figure 12, is so formed that the top and bottom walls 150b and 150c, respectively, thereof are spaced just far enough apart to readily accommodate the portion of the record form between the feed rolls. The top of the case 150 is, as in the first embodiment described, provided with a checkered surface 121 and is formed with apertures in the squares of said surface in the manner and for the purpose heretofore pointed out. If it is desired to provide indicia on the record form 40a by perforations, instead of by marks, the bottom 150c of the case 150 may be formed with apertures 150d (Figure 12) which align with the apertures 122 in the top of the case.

Referring to Figures 11 and 12, it will be noted that the cap-piece 161 is formed in its bridge section with flanges 161a to provide a channel for accommodating the narrow portion of the case extending between the two feed rolls.

At the ends opposite the knobs 130a and 135a, the feed rolls carry grooved heads 130b (Figure 14) and 135b (Figure 13), respectively. The two heads 130b and 135b are similar except that the latter is formed with spaced indentations 132 which co-operate with a detent 123a carried by a spring finger 123 on the case 150. A similar detent 123b (Figure 14) which is carried by a similar spring finger 123c engages the annular groove in the head 130b of the roll 130, the two detents holding the respective feed rolls in axial alignment and the detent associated with the roll 130 serving additionally to offer resistance to turning of the roll so that the record form may be held under the desired tension. The indentations 132 in the head 135b on the feed roll 135 provide means for feeding the record form in the desired increments. Thus, by turning the knob 135a until the detent 133 associated with said roll snaps into an indentation adjacent to the one which it originally occupied, advancing of the record form the desired, predetermined distance after the recording of the move of a game piece is effected. Feeding of the record form is thus accurately controlled.

The devices have been illustrated and described in connection with games, specifically chess and checkers. It is to be understood, however, that this is intended by way of example only and that the advantages of the invention may be attained by the use of the devices in various environments in which recording and indicating for different purposes may be desired.

I claim as my invention:

1. A device of the character described comprising a case having a top wall and a bottom wall, said top wall providing a playing table that is marked on its outside surface to provide a gameboard having a plurality of playing squares, said top having a plurality of apertures formed therein in a pattern corresponding to positions to which game pieces may be moved over said squares, a cartridge which includes spaced-apart feed rolls which carry a record form, each of said rolls having a head which is formed with a groove and one of which is formed with angularly spaced indentations at the bottom of its groove, said cartridge being insertable into said case so that the portion of the record form between said feed rolls will be located between said top and bottom walls, whereby to enable such portion to be acted upon by marking means inserted through said apertures, and detents carried by said case and engageable with said grooves and said indentations to releasably hold said feed rolls in proper lateral alignment and accurately regulate their turning movements.

2. A device of the character described comprising a case having a top wall, and a parallel bottom wall and having two hollow cylinders at opposite ends of said walls which connect said walls together at their opposite ends, said top wall providing a playing table that is marked on its outside surface to provide a gameboard having a plurality of playing squares, said top having a plurality of apertures extending therethrough in a pattern corresponding to positions to which gamepieces may be moved on said squares, a cartridge comprising a pair of parallel, spaced bridging members, and a pair of parallel, spaced feed rolls, which carry a record form, journaled at opposite ends in said bridging members, said feed rolls being spaced apart a distance equal to the distance between the axes of said cylinders, said cartridge being insertable in said case with the feed rolls fitting into said cylinders and so that the portion of the record form between said feed rolls will be located between said top and bottom walls of said case, whereby to enable such portion to be acted upon by marking means inserted through said apertures, and means carried by said case and engageable with said feed rolls to maintain said rolls in lateral alignment and for releasably locking one feed roll, at least, in the successive angular positions to which it is rotated in movement of the record form after successive moves of the gamepieces have been recorded thereon by the marking means, one of said bridging members being grooved longitudinally between said feed rolls to receive the adjacent ends of said top and bottom walls of said case.

References Cited in the file of this patent
UNITED STATES PATENTS

| Number | Name | Date |
|---|---|---|
| 529,913 | Howell | Nov. 27, 1894 |
| 1,431,834 | Mohr | Oct. 10, 1922 |
| 1,443,732 | Cook | Jan. 30, 1923 |
| 1,499,016 | Guyton | June 24, 1924 |
| 1,532,069 | Ortiz | Mar. 31, 1925 |
| 1,730,640 | Brownell | Oct. 8, 1929 |
| 1,750,539 | Paulson | Mar. 11, 1930 |
| 2,543,339 | Simunek et al. | Feb. 27, 1951 |
| 2,569,860 | Merhar | Oct. 2, 1951 |